Patented Feb. 19, 1935

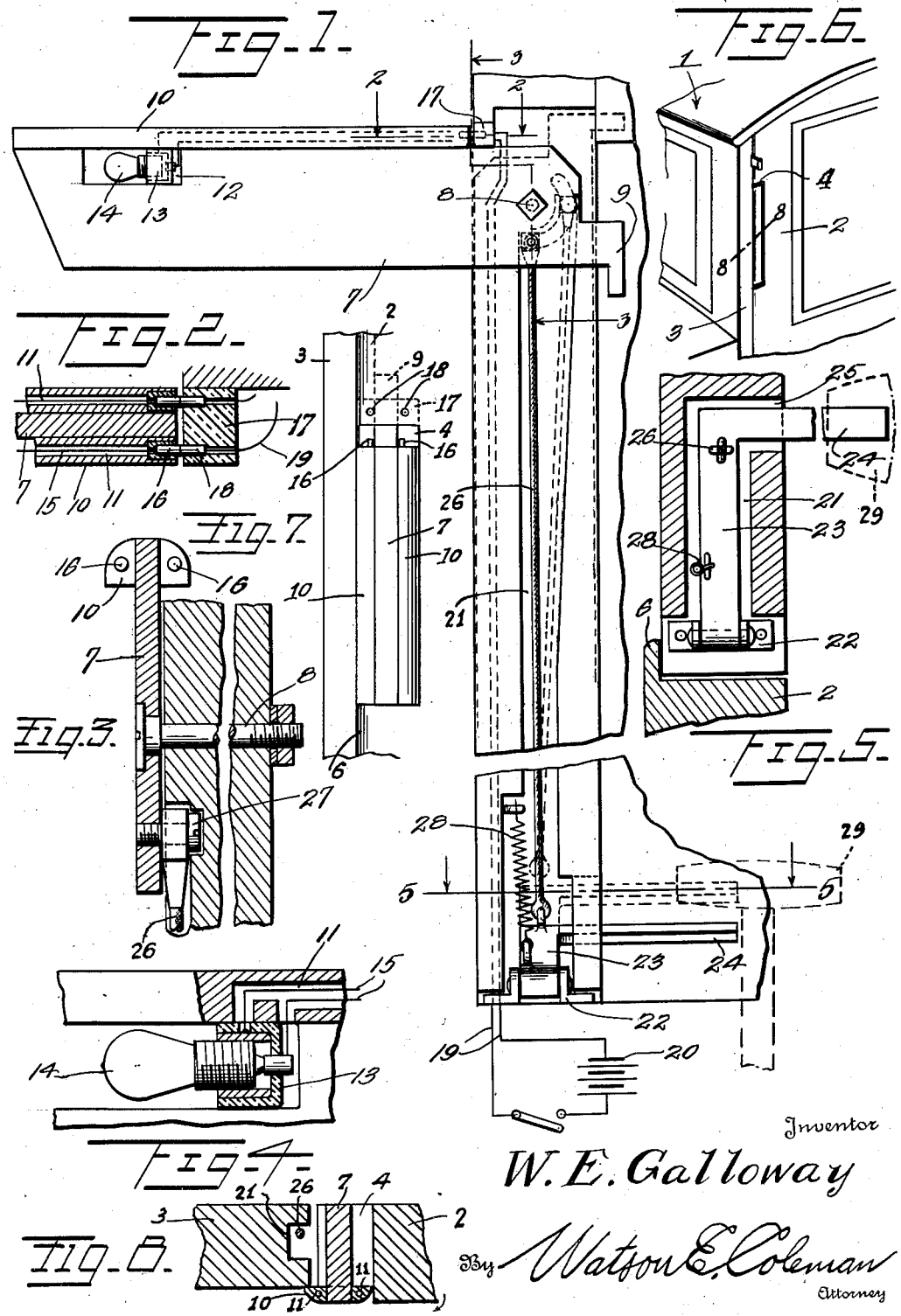

1,991,800

UNITED STATES PATENT OFFICE 1,991,800

MOTOR VEHICLE SIGNAL

Walter E. Galloway, Wilson, Tex.

Application October 11, 1932, Serial No. 637,311

4 Claims. (Cl. 116—52)

This invention relates to signal devices and pertains particularly to a signal for use upon a motor vehicle.

The primary object of the present invention is to provide a motor vehicle signal by means of which the driver of a motor vehicle may indicate to drivers following and to traffic officers his intention to make a turn, which signal is adapted to be operated either by the hand or by the foot of the driver or when properly located in the vehicle it can be operated at the same time as the clutch pedal of the machine.

Another object of the invention is to provide a motor vehicle signal designed particularly for use upon closed motor vehicles of the sedan or coupe type and to be mounted in the top structure thereof so that when it is not in use it will be substantially completely hidden from view.

Still another object of the invention is to provide a motor vehicle signal for use in vehicles of the type above stated, in which novel means for mounting the same is employed and a novel means is employed for actuating or moving the signal to operative position.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:—

Figure 1 is a view in elevation of the inner face of the frame of a door of a closed motor vehicle showing the signal structure embodying the present invention mounted therein, the signal being shown in operative or signalling position;

Figure 2 is a sectional view taken substantially upon the line 2—2 of Figure 1;

Figure 3 is a sectional view taken substantially upon the line 3—3 of Figure 1, the same being on an enlarged scale;

Figure 4 is a view partly in section and partly in elevation on an enlarged scale of the incandescent light receptacle of the signal;

Figure 5 is a sectional view taken substantially upon the line 5—5 of Figure 1;

Figure 6 is a detailed perspective view of a left hand front corner of a closed motor vehicle showing the position occupied by the signal;

Figure 7 is a view upon an enlarged scale in elevation of a portion of a vehicle body showing the appearance of the present invention when viewed from the exterior of the vehicle;

Figure 8 is an enlarged sectional view taken substantially upon the line 8—8 of Figure 6.

Referring now more particularly to the drawing wherein like numerals of reference indicate corresponding parts throughout the several views, the numeral 1 indicates generally the corner portion of a closed motor vehicle of the sedan or coupe type wherein the front door is indicated by the numeral 2 and the front frame or jamb of the door is indicated by the numeral 3. The present signal structure is designed to be positioned in a pocket or recess 4 formed in the forward edge face of the door 2 which is hinged to the jamb 3, against which it abuts when in closed position. The signal structure is so designed that when it is in inoperative position a portion thereof will replace a part of the door structure which has been cut away, as shown in Figure 6. The cut away portion 4 of the door extends through the flange portion 6 which normally extends from the door over a portion of the side face of the body.

The signal proper comprises an arm 7 which is of greater width than thickness and this is adapted to enter the recess 4 in the door of the vehicle. The width of the arm extends from the front to the rear of the recess and the thickness thereof is less than the depth of the recess from the face of the door inwardly.

The upper end of the arm is pivotally mounted upon a bolt 8 secured in the face of the door jamb and this end of the arm is provided with an inward extension or finger 9 which projects into the interior of the vehicle and constitutes a means by which the arm may be manually swung outwardly in the event that the foot operating means therefor fails to work.

The outer longitudinal edge of the arm 7 has a molding 10 therealong from its free end to a point short of the upper end thereof and this molding as shown in Figure 3 projects beyond the side faces of the arm. The molding 10 is provided with the two passageways 11 which lead from the inner end thereof forwardly and terminate over and open into a chamber 12 formed in the arm and opening through the two side faces thereof as shown in Figures 1 and 4. In this chamber 12 is an incandescent bulb socket 13 in which a signal lamp 14 is mounted and the passages 11 have electric wires 15 running therethrough and connecting at their forward ends with the usual contacts of the socket 13 and at their rear ends connecting with the metal contact pins 16 which are mounted in the ends of the passages 11 and project a short distance therefrom as shown in Figure 2 for the purpose about to be described.

Secured to the jamb to project into the recess 4 in which the signal arm is positioned, is a body of insulation 17 in which are fixed the two contact pins 18 which project beyond the outer face of the body and are so positioned that when the arm 7 is raised to the horizontal position shown, the contacts 16 carried thereby will engage with these contacts and thus transmit current to the incandescent lamp 14 from the wires 19 which form a circuit in which a battery 20, which may be the battery of the motor vehicle, is placed.

The face of the door jamb 3 has formed therein the channel 21 which extends from the upper end of the recess 4 downwardly to a point adjacent the floor of the vehicle. At its lower end this recess has mounted therein the bearing structure 22 which pivotally supports one end of a lever 23 which at its other or free end has the lateral extension 24 which projects from the recess 21 through the lateral opening 25 into the interior of the motor vehicle. Attached to this lever adjacent the free end is one end of a cable 26 which passes upwardly in the channel 21 and has its other end attached by means of the screw 27 to the arm 7 at one side of the pivot bolt 8. Through the medium of this lever 23 and the cable 26 the operator of the vehicle may raise the arm 7 to the horizontal position shown by pressing downwardly upon the lateral extension or treadle portion 24 of the lever with his foot. By doing this the treadle will be forced downwardly from the raised inclined position which it normally assumes and will apply the necessary pull to the cable 26 to swing the arm outwardly in the manner shown. When the foot of the operator is removed from the treadle 24 the arm 7 will drop back by gravity to its normal position within the recess 4 and the treadle and lever will be drawn back or raised to inoperative position by means of the spring 28 which is connected at one end with the lever at a point intermediate its ends and has its other end fixed to the side wall of the channel in the manner shown in Figure 1.

It will, of course, be readily apparent that when the signal arm 7 is raised to the horizontal position shown the contacts 16 thereof will come into engagement with the contacts 18 and the signal lamp will be illuminated. In the event that the foot treadle cannot be operated the operator may swing the arm outwardly by hand by pulling down upon the extension 9 which projects from the upper end thereof into the vehicle.

While the present structure has been described as being operated by hand or by the foot of the operator it will, of course, be readily apparent that by properly positioning the treadle 24 with respect to the treadle portion of the clutch lever of the machine the latter may be made to operate the signal simultaneously with its movement inwardly to release the machine clutch.

While in the description of the present invention and in the drawing the invention has been set forth as being housed in a recess in the car door it is to be understood that this is the construction which will preferably be employed or followed where the signal is built into a car body when the same is constructed. Where the signal is to be added to cars already constructed, as an accessory, the arm, which is of thin cross section as shown in Figure 3, will be mounted to operate between the door and the jamb, there being sufficient space about the door between it and the jamb for this purpose.

The operating cord will then be run down between the inner and outer walls of the car body and the only change which will have to be made therein will be the removing of a portion of the flange of the door which will be replaced by the molding 10 of the signal, and the forming of an arcuate slot in the inner wall of the body for the foot treadle portion 24 of the actuating lever. The operating cord 26, the spring 28 and the arm 23 and bearing 22 of the lever will be located between the inner and outer walls of the body, the bearing being mounted directly upon the floor of the car.

It is preferred in mounting the foot lever that the same be placed upon the floor sufficiently far forward so that the foot treadle portion 24 will be in position to be engaged by the treadle portion of the clutch lever of the motor vehicle, which is indicated in dotted lines by the numeral 29, when the latter is depressed and thereby operate the signal simultaneously with the disengagement of the clutch.

It will be seen from the foregoing that a signal of the character herein set forth may be inconspicuously mounted upon a motor vehicle and will serve to give an unmistakable warning when actuated, of the motor vehicle driver's intention to make a turn, particularly a left turn.

Having thus described the invention, what is claimed is:—

1. In combination, a closed motor vehicle having a door frame and a door therein, said door having a recess in one edge face adjacent the top of the door and said frame having a channel extending longitudinally of its face from the upper end of the recess in the door to a point adjacent the bottom of the door frame, a signal arm normally closing said recess and pivotally attached at its upper end to the frame to swing outwardly and upwardly to horizontal position, a cable connected at one end with said signal arm adjacent the pivotal attachment therefor and extending downwardly in said channel, a foot lever pivotally mounted within the lower end of said channel and having a lateral treadle extension projecting into the motor vehicle, the other end of said cable being attached to said foot lever, and a finger extending laterally from the upper end of the signal arm into the vehicle for the hand operation of the arm.

2. In a motor vehicle having a top structure including a corner post and a clutch actuating lever, a signal arm pivotally mounted upon said corner post to swing outwardly from the top structure, a treadle pivotally mounted within the vehicle upon the floor thereof and having a lateral arm disposed in a position to be engaged and depressed by said clutch lever when the latter is actuated, and a connecting element between the treadle and the arm whereby upon depression of the treadle the arm will be swung outwardly.

3. In a motor vehicle having a top structure including a door frame and a door therein having a flange, a recess formed in the door and extending through the flange thereof, an arm positioned in said recess and normally filling the same, means pivotally securing the arm to the frame, a molding forming a part of said arm and replacing the removed portion of the flange when the arm is in inoperative position, a pivotally mounted foot actuated treadle within the vehicle, and connecting means between the arm and the treadle whereby upon actuation of the latter the arm will be swung outwardly to signalling position.

4. In a vehicle having a top structure including a corner post, and a door opening in the structure, a door in the opening, a recess in said door opening outwardly therefrom and its upper end opening into the interior of the vehicle, an arm member normally disposed in said recess, a supporting pin secured in the corner post and passing through and pivotally supporting said arm whereby the latter may be swung outwardly from the recess to a signalling position, a finger extending laterally from the upper end of the arm into the vehicle for facilitating the hand actuation of the arm, and means coupled with the arm whereby an occupant of the vehicle may actuate the arm by means of his foot.

WALTER E. GALLOWAY.